United States Patent [19]

Austin

[11] Patent Number: 5,559,925
[45] Date of Patent: Sep. 24, 1996

[54] DETERMINING THE USEABILITY OF INPUT SIGNALS IN A DATA RECOGNITION SYSTEM

[75] Inventor: Stephen C. Austin, San Mateo, Calif.

[73] Assignee: Apple Computer, Inc., Cupertino, Calif.

[21] Appl. No.: 267,113

[22] Filed: Jun. 24, 1994

[51] Int. Cl.⁶ .................................................. G10L 5/00
[52] U.S. Cl. ........................ 395/2.4; 395/2.6; 395/2.35
[58] Field of Search ............................. 395/2; 381/41–46

[56] References Cited

U.S. PATENT DOCUMENTS

| | | | |
|---|---|---|---|
| 5,187,747 | 2/1993 | Capello et al. | 382/2 |
| 5,208,897 | 5/1993 | Hutchins | 395/2 |
| 5,251,131 | 10/1993 | Masand et al. | 364/419.08 |

Primary Examiner—Allen R. MacDonald
Assistant Examiner—Vijay B. Chawan
Attorney, Agent, or Firm—Carr, DeFilippo & Ferrell

[57] ABSTRACT

A system for generating a signal proportional to the useability of the output of a speech recognition system comprises a processor, an engine, and a histogram object. The histogram object comprises a first histogram constructed from the confidence scores of correctly recognized utterances and a second histogram constructed form incorrectly recognized utterances. The present invention also includes a system and method for constructing the histogram object comprising a processor, a data memory, and an engine. The data memory comprises a plurality of output records where each output record contains the confidence score for an utterance recognized by the speech recognition system and an indicator of whether or hot the speech recognition system correctly recognized the utterance.

27 Claims, 8 Drawing Sheets

DETERMINING THE USEABILITY OF INPUT SIGNALS IN A DATA RECOGNITION SYSTEM

BACKGROUND OF THE INVENTION

1. Field of the Invention

This invention relates to data recognition systems and more particularly to a computer system and method for estimating and signaling the recognition accuracy of inputs in a data recognition system.

2. Description of the Background Art

In order to increase convenience and ease of use of their products, the manufacturers of computer systems have expanded the input devices of computer systems to accept inputs in such data forms as audio signals and handwriting data. Speech recognition systems, for example, accept an audio input and analyze it to determine the command or data. The, systems determine the appropriate action to take by analyzing the input in the frequency and time domains and comparing the analyzed input to expected inputs. The systems generate a list of statements that possibly match the input. Each possible matching statement, also known as a theory, has a matching score that indicates how closely, as determined by the system, the theory matches the input. Generally, the systems recognize the theory with the highest matching score as the matching statement. The theory with the highest matching score, however, does not necessarily, actually match the input.

This approach to recognizing data signals has several problems. It bases the selection of the matching data simply on the magnitude of the matching scores of the theories. The theory with the highest matching score does not necessarily truly represent the content of the input. The probability that the system will recognize the wrong theory is particularly high, when the difference in matching scores between the highest theory and the next highest theory is very small.

A prior art solution to this problem is to set a threshold for the difference between the matching score of the highest scoring theory, which is recognized as the correct match, and the next highest scoring theory. This difference is referred to as the confidence score of the highest scoring theory. The confidence score indicates the confusability of the theory having the highest matching score with the other generated theories. For inputs that have a high degree of confusability, the confidence score will generally be low; whereas utterances that are not confusable will generally have a high confidence score. If the confidence score is above the threshold, the system will recognize the highest scoring theory as the match. If the confidence is below the threshold, the system will not recognize the highest scoring theory as the match. In this latter case, the prior art system will simply ignore the input.

This prior art solution has several problems. The approach is Boolean; the system either recognizes the input or it does not recognize the input. There is no provision for a measure of the probability that the highest scoring theory does not match the input. Any threshold is arbitrary and depends on the designer of the system. Thus, the threshold may be too broad or too narrow. The threshold also will not account for systematic signal variations such as accents and dialects as might be encountered within a language. In the case of speech recognition systems, assuming the correct threshold is identical for all dialects and accents within a language, that threshold may not be correct for other languages.

There is a need in data recognition systems for a system and method for accurately determining and signaling the probability that the recognized data matches the input. The system and method should be based upon the expected language of the input and must be sufficiently fast so that it can operate in real time with the input device.

SUMMARY OF THE INVENTION

The present invention overcomes the problems and limitations of the prior art with an apparatus and method for generating a signal that is proportional to the probability that a speech recognition system correctly recognized an input utterance. The apparatus comprises a processor, a histogram object, and an engine; the apparatus accepts an input of the matching scores for the two highest scoring theories generated by the speech recognition system for an input utterance. The engine, using the histogram object, determines the likelihood that the speech recognition system correctly recognized the utterance and generates a signal that is directly proportional to the probability of recognition.

The histogram object comprises a first histogram, constructed using instances where the speech recognition system correctly recognized utterances, and a second histogram, constructed using instances where the speech recognition system incorrectly recognized utterances. Thus, the system is based on the language that the speech recognition system is programmed to recognize. By using actual instances of utterances, the present invention advantageously eliminates designer prejudice and error.

The present invention also includes an apparatus and method for constructing a histogram object. The system comprises a data memory, an engine, and a processor. The data memory stores a plurality of records of confidence scores of utterances recognized by the speech recognition system. Each record also contains an indicator of whether or not the speech recognition system correctly recognized the utterance. The engine uses the records to construct the histogram object.

DESCRIPTION OF THE PREFERRED EMBODIMENT

Figure 1:
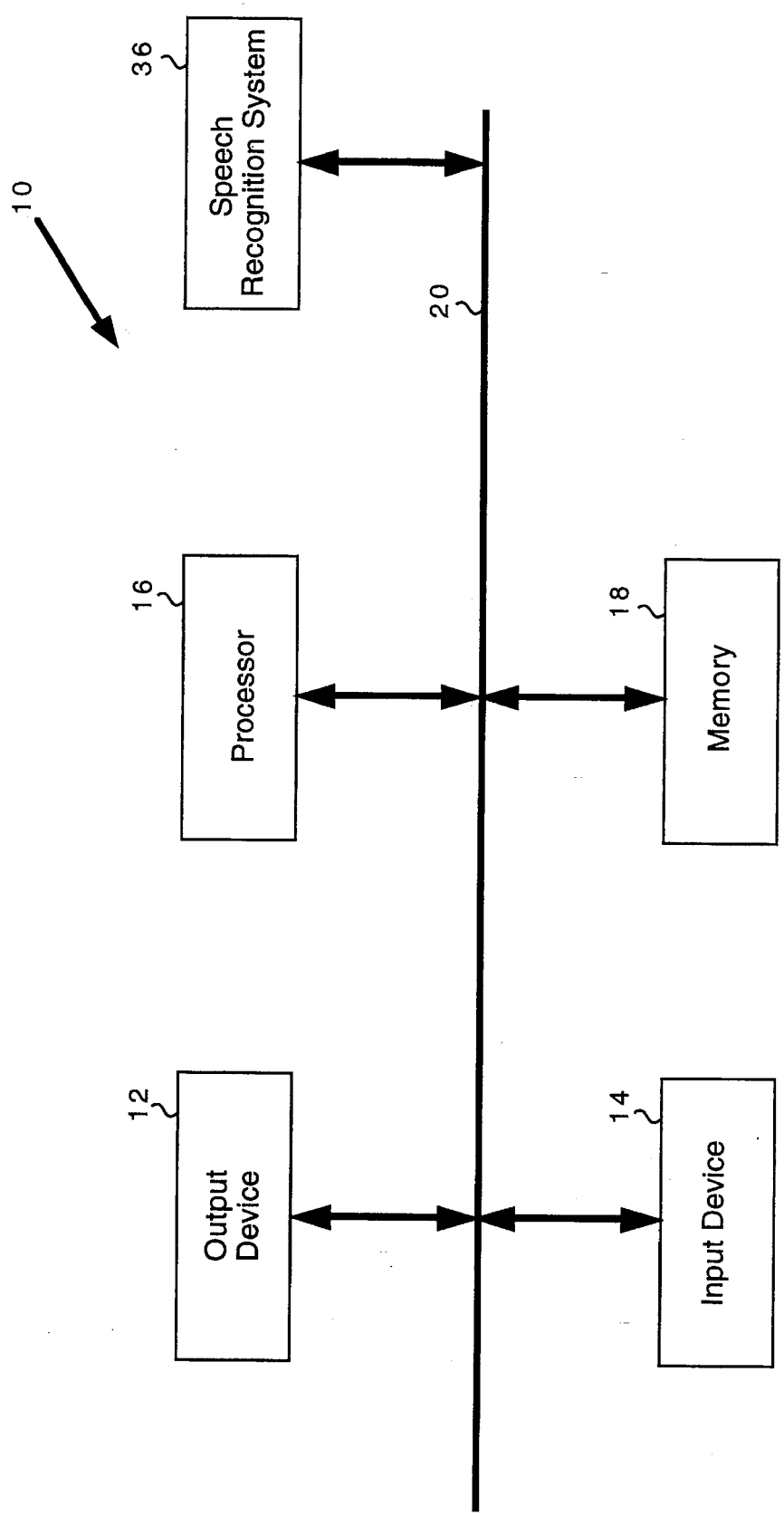
FIG. 1 is a block diagram showing the system of the present invention for estimating the recognition accuracy of inputs by a speech recognition system.

Referring now to FIG. 1, a block diagram of a preferred embodiment of a computer 10 is shown for generating a signal indicating the useability of data in a signal recognition system constructed in accordance with the present invention. Although the invention has broad application, the preferred embodiment described herein pertains to the useability of signals that indicate the recognition of audio signals in a speech recognition system. The computer 10 preferably comprises an output device 12, an input device 14, a processor 16, a memory 18, and a speech recognition system 36. The processor 16, output device 12, input device 14, and memory 18 are coupled in a von Neuman architecture via a bus 20 such as in a personal computer. The processor 16 is preferably a microprocessor such as a Motorola 68040; the output device 12 is preferably a video monitor; and the input device 14 is preferably a keyboard, a pointing device such as a mouse type controller, and a microphone. In an exemplary embodiment, the computer 10 is a Macintosh Quadra 800 computer. Those skilled in the art will realize that the computer 10 could be implemented on an Intel microprocessor based personal computer or on an Apple/Motorola/ I.B.M. PowerPC microprocessor based computer system.

A speech recognition system 36 is also coupled to the bus 20. The speech recognition system 36 is a conventional system for analyzing and recognizing audio data. Preferably, the speech recognition system 36 is a set of programmed instructions which operate on the processor 16 to implement a speech recognition function. The basic unit or packet of input audio data is called an utterance. For each utterance processed by the speech recognition system 36, the speech recognition system 36 generates at least two theories that closely match the input speech signal. The speech recognition system 36 preferably uses a hidden Markov model of the input speech signal to generate the theories. For each theory, the speech recognition system 36 also generates a matching score that indicates how well the theory matches the input utterance. The matching score is preferably the logarithmic likelihood of the utterance conditioned upon the theory. Those skilled in the art will realize that there are many alternative methods by which the speech recognition system 36 can generate theories and matching scores from an utterance.

Figure 2:
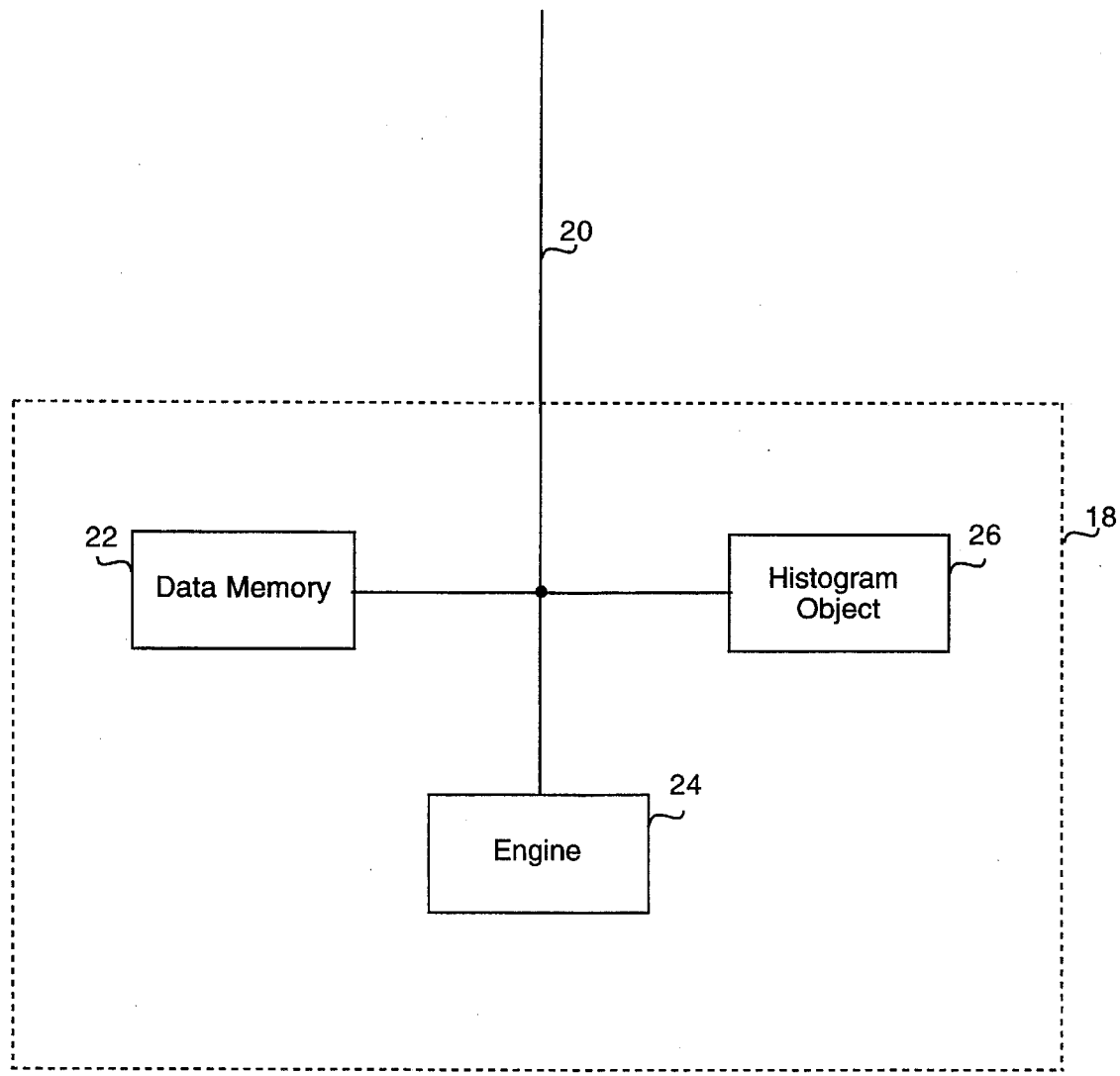
FIG. 2 is a block diagram showing the memory structure preferably used in the system of FIG. 1.

Referring now to FIG. 2, a preferred embodiment of the memory 18 is shown. While the components of the memory 18 will now be discussed as separate devices, those skilled in the art will realize that the memory 18 may be a single dynamic random access memory. The memory 18 comprises a data memory 22, an engine 24, and a histogram object 26.

The histogram object 26 is a data structure, such as a lookup table or data array, produced by the operation of the engine 24 in the processing of data stored in data memory 22. Based upon confidence score, the histogram object 26 describes, the ability of the speech recognition system 36 to correctly recognize an input utterance.

The engine 24 is a set of program instruction steps that operate on the processor 16 (FIG. 1) to implement the present invention. In a learning mode, engine 24 processes outputs of the speech recognition system 36 and stores the output in the data memory 22. The engine 24 then uses this data to construct the histogram object 26. Later, in an user mode, the engine 24 uses the histogram object 26 to analyze inputs and to generate an output signal. This signal is proportional to the probability that the speech recognition system 36 correctly recognized an input utterance.

Figure 3:
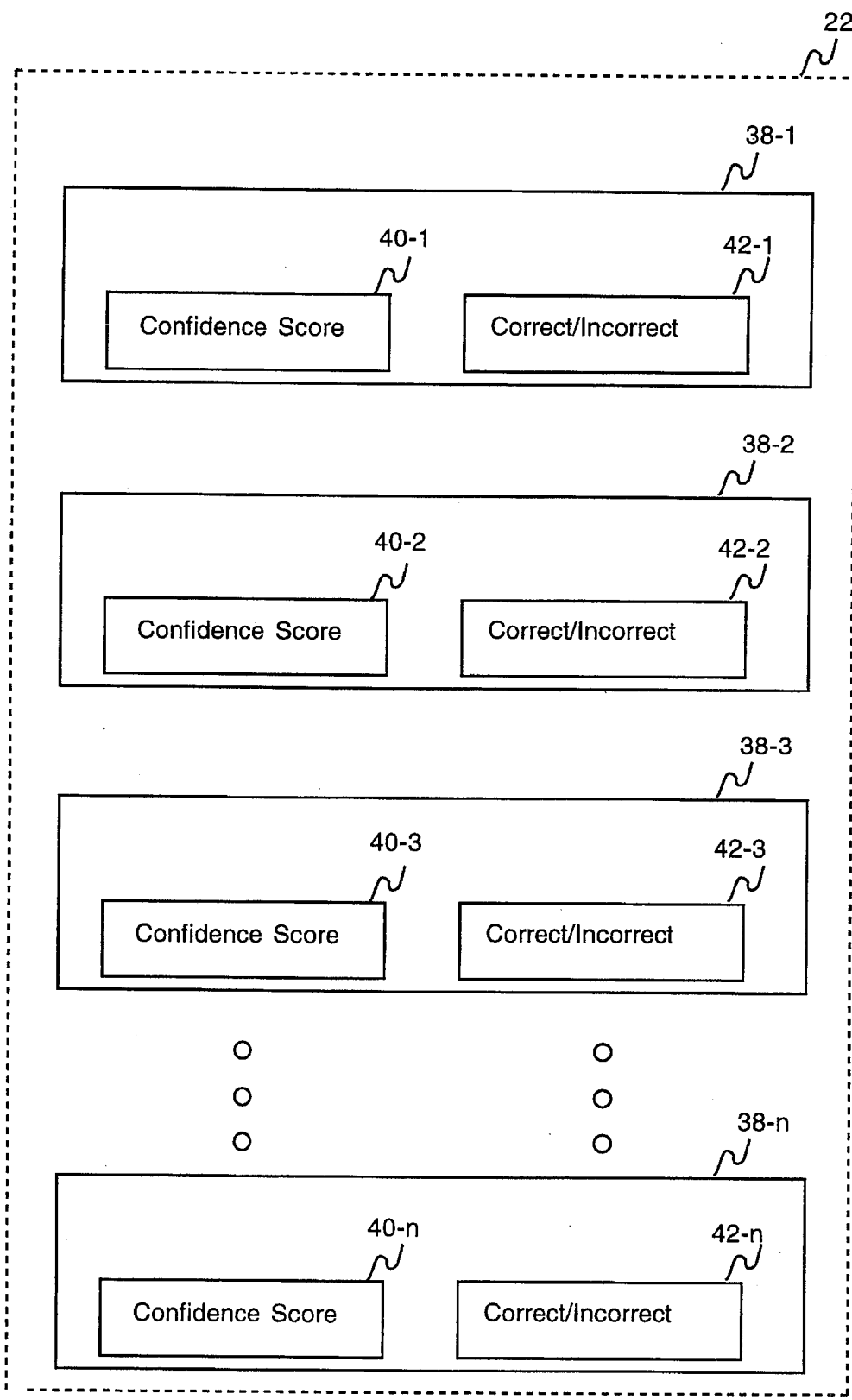
FIG. 3 is a block diagram showing the data memory structure preferably used in the data memory of FIG. 2.

Referring now to FIG. 3, a block diagram is shown of the data memory 22. The data memory 22 comprises a plurality of output records 38 which are the processed results of audio signals that were previously input to the speech recognition system 36. Each output record 38-1 to 38-n comprises a confidence record 40 of the confidence score of the speech recognition system 36 for an input utterance. In addition, an output record 38 includes a recognition record 42. The recognition record 42 indicates whether or not the speech recognition system 36 correctly recognized the utterance. The speech recognition system 36 analyzes each input utterance, generates at least two theories with accompanying matching scores, and selects the theory with the greatest matching score as the recognized input.

The engine 24 receives the output from the speech recognition system 36, subtracts the second highest matching score from the highest matching score, and stores the result in the confidence score 40. Through the output device 12, the engine 24 outputs the theory with the highest matching score. A human user reviews this theory and indicates, through the input device 14, whether or not the speech recognition system 36 correctly recognized the input utterance. The engine 24 stores this input in the recognition record 42 of the output record 38 for the input utterance.

The data memory 22 includes output records 38 of utterances from many people. Most persons, who generate an utterance recorded in the data memory 22, preferably speak the same language. Some persons, however, speak languages other than the majority language. The computer 10 may encounter, from time to time, inputs from persons speaking languages other than the majority language, in these cases the speech recognition system 36 will invariably produce an incorrect result. Thus, the inclusion in the data memory 22 of records of utterances by persons speaking languages other the majority language is appropriate.

Figure 4:
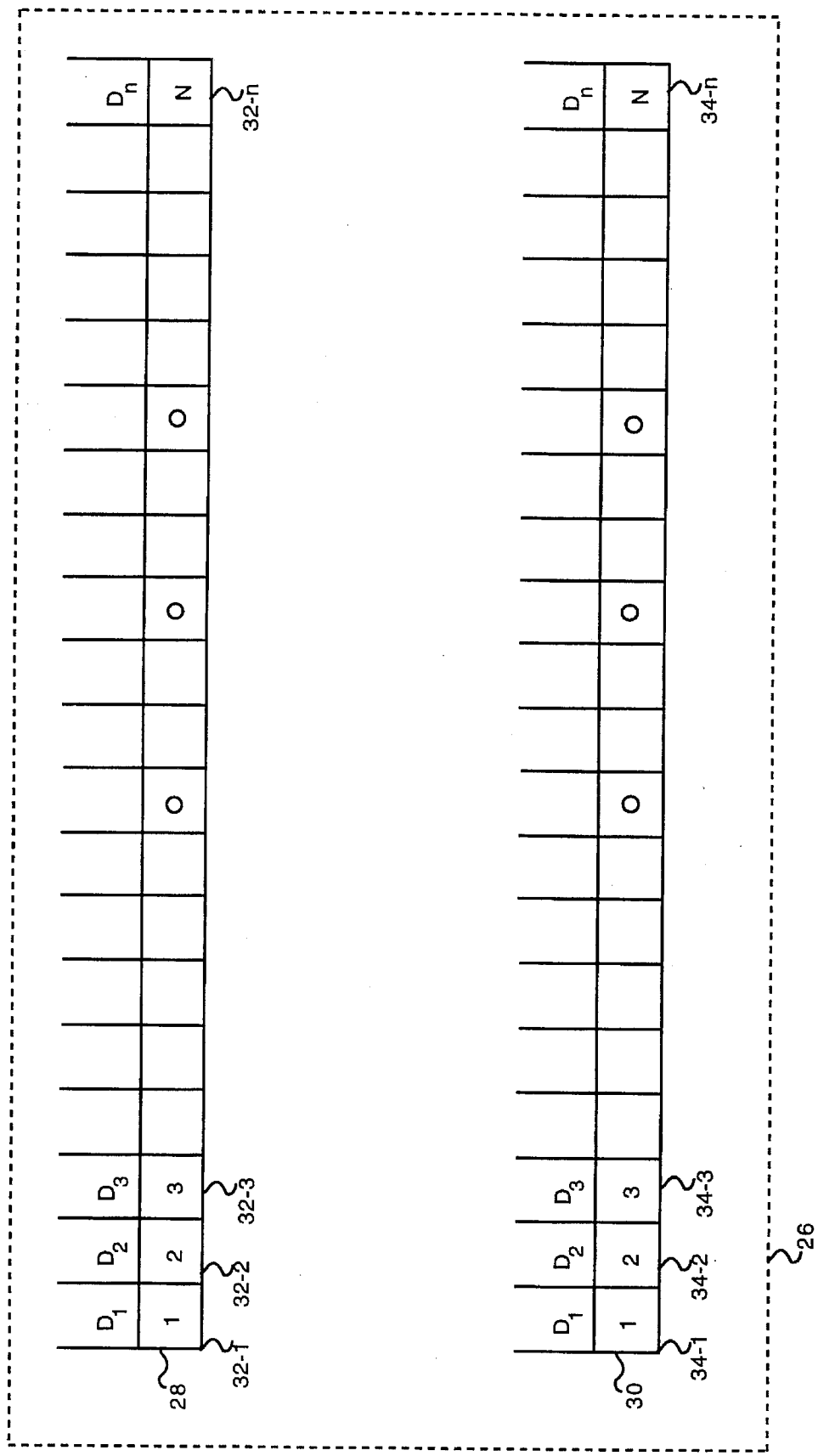
FIG. 4 is a block diagram showing details of the histogram object of FIG. 2.

Referring now to FIG. 4, a block diagram is shown of the histogram object 26. The histogram object 26 comprises a first histogram 28 and a second histogram 30. The engine 24 uses instances of correct recognition by the speech recognition system 36 to construct the first histogram 28. The first histogram 28 comprises a plurality of bins 32-1 to 32-n. Each bin 32 is a memory location for storing a data value, $D_x$. The data value $D_x$ is the significant part of the histogram 28 and is determined by the engine 24 using the data stored in the data memory 22. Each bin 32-1 to 32-n has a bin number which identifies the bin 32-1 to 32-n. The number of bins 32 depends on the number of records contained in the data memory 22. In an exemplary embodiment, the first histogram 28 comprises 20 bins 32. Similarly, the engine 24 uses instances of incorrect recognition by the speech recognition system 36 to construct the second histogram 30. The second histogram 30 contains a plurality of bins 34-1 to 34-n. Bins 34-1 to 34-n also have bin numbers which identify the bins. Preferably, there are the same number of bins 34-1 to 34-n in the second histogram 30 as there are bins 32-1 to 32-n in the first histogram 28.

When the computer 10 is first used with a speech recognition system 36, the computer 10 enters a learning, or training mode in which the computer user checks the matching result identified by the speech recognition 36. The speech recognition system 36 outputs, for each utterance, at least 2 theories and a matching score for each theory. The engine 24 generates a confidence score and then stores the confidence score in the confidence record 40. The engine 24 also stores, in the recognition record 42, the indication from the human user of whether or not the speech recognition system 36 correctly recognized the utterance. After the outputs for the learning mode have been analyzed by a human user and the confidence score has been generated, the engine 24 eliminates those output records 38 where the confidence records 40 of the output records 38 store outlying confidence scores. The engine 24 then sorts the output records 38-1 to 38-n into two groups, one group where the recognition records 42 indicate that the speech recognition system 36 correctly recognized the utterance and another group where the recognition records 42 indicate that the speech recognition system 36 incorrectly recognized the utterance. Finally, the engine 24 processes the confidence score stored in each confidence record 40 and generates a signal to store a data value in the appropriate bin 32, 34 in the histogram object 26.

Once the learning mode is completed, the computer 10 is available for operation in a user mode. In determining the useability of an output signal of the speech recognition system 36, the engine 24 determines the confidence score of the output of the speech recognition system 36. Then, the engine 24 processes the confidence score and uses the result to obtain data from the histogram object 26. With the data from the histogram object 26, the engine 24 determines the useability of the output signal of the speech recognition system 36 and generates a signal proportional to such useability.

Figure 5A:
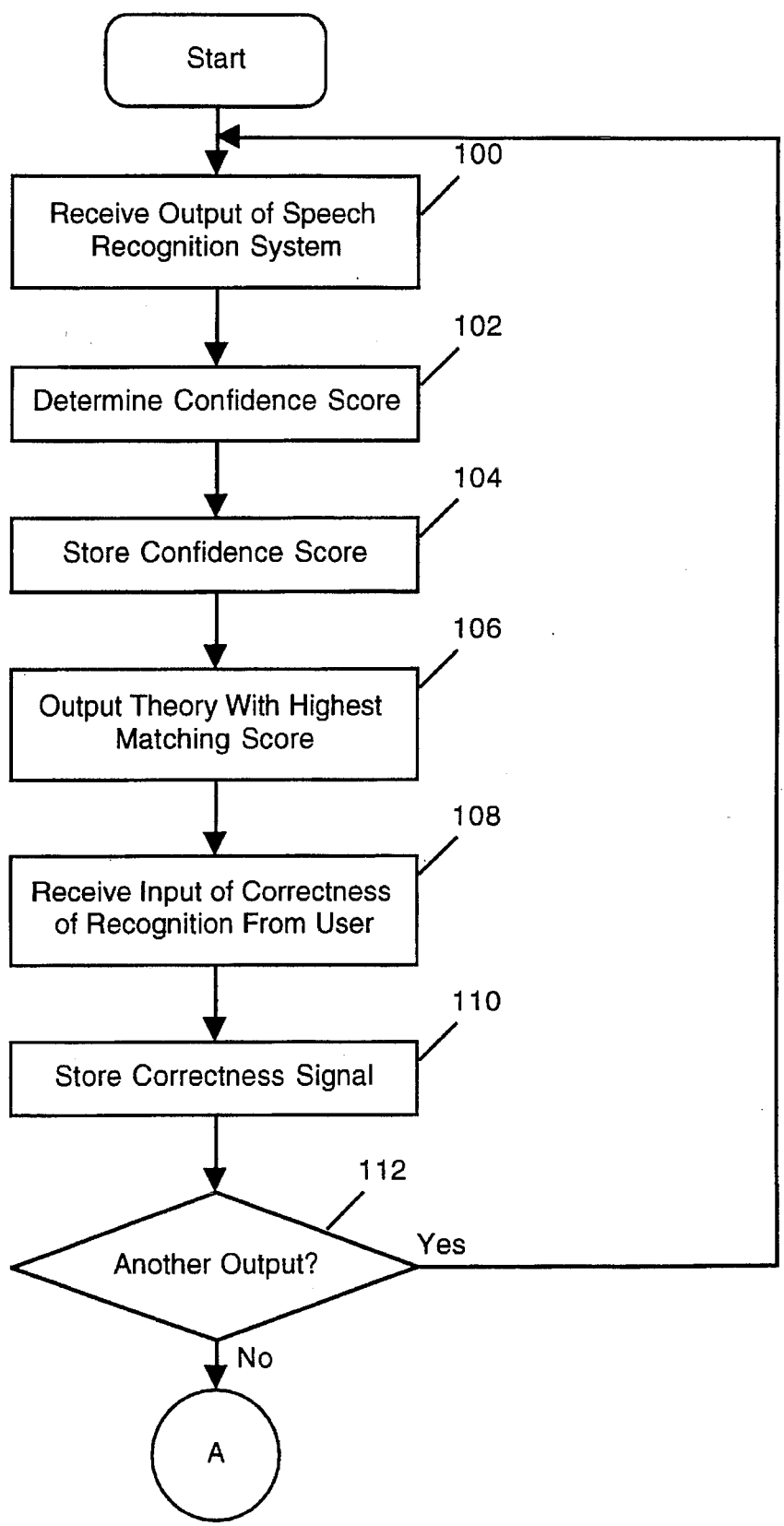
FIGS. 5A and 5B are flowcharts showing the preferred method of a learning mode for the system of FIG. 1.
Figure 5B:
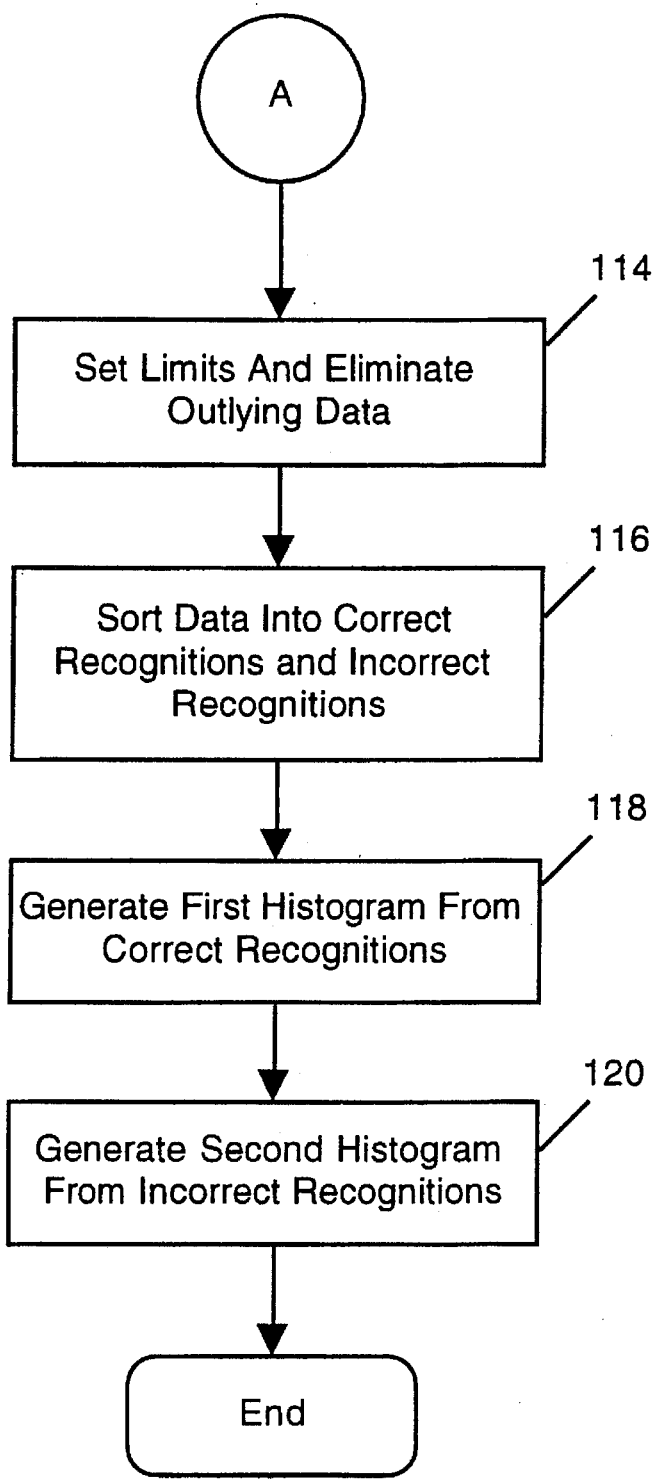

Referring now to FIGS. 5A and 5B, a flowchart is shown of the learning mode in the preferred method in which the histogram object 26 is constructed. In the learning mode, the computer 10 learns the ability of the speech recognition system 36 to recognize accurately input signals. The learning mode is based on actual utterances made by real people. The computer 10 learns from a plurality of input signals that the speech recognition system 36 analyzes specifically for the learning mode. The learning mode begins in step 100 where the engine 24 receives in output from the speech recognition system 36. Before the engine 24 constructs the histogram object 26, a large number of utterances must be stored in the memory 18. These utterances preferably come from many different people who generate at least one utterance. The speech recognition system 36 processes each utterance in turn and hands off its output to the engine 24.

The engine 24, in step 102, determines the confidence score for the output of the speech recognition system 36. To generate the confidence score, the engine 24 subtracts the second highest matching score from the highest matching score. In step 104, the engine 24 stores the confidence score in the confidence record 40 of the output record 38 for the current utterance. In step 106, the engine 24 outputs, on the output device 12, the theory with the highest matching score. Then, the engine 24 receives, in step 108, an input from a human user, through the input device 14, of whether or not the speech recognition system 36 correctly recognized the utterance. In step 110, the engine 24 stores the input in the recognition record 42. The engine 24 then, in step 112, determines whether or not there is another utterance that the speech recognition system 36 is processing. If there is another utterance in step 112, the method returns to step 100 to process the next output of the speech recognition 36.

If in step 112 there are no more utterances being processed by the speech recognition system 36, the method continues in step 114. In step 114, the engine 24 sets limits on the acceptability of the confidence stores and then eliminates output records 38 with outlying confidence scores. The engine 24 eliminates these output records 38 by selecting a first output record 38 with a confidence record 40 storing a confidence score such that a pre-determined percentage of the confidence scores stored in the confidence records 40-1 to 40-n of output records 38-1 to 38-n are below the confidence score of the first output record 38. Similarly, the engine 24 also selects a second output record 38 with a confidence record 40 storing a confidence score such that a pre-determined percentage of the confidence scores stored in the confidence records 40-1 to 40-n of the output records 38-1 to 38-n are above the confidence score of the second output record. The engine 24 eliminates those output records 38 having confidence scores below the first output record 38 and those output records 38 having confidence scores above the second output record 38. The pre-determined percentage is preferably 1 percent. In the memory 18, the engine 24 records a reference of the confidence score of the first output record 38 and of the confidence score of the second output record 38. Thus, engine 24 eliminates the bottom one percentile and the top one percentile of the confidence scores. These confidence scores are eliminated so that the engine 24 may construct smooth well formed histograms 28, 30.

In step 116, the engine 24 sorts the output records 38-1 to 38-n and divides the output records 38-1 to 38-n into a first group and a second group. The first group comprises output records 38 having; recognition records 42 that indicate that the speech recognition system 36 correctly recognized the input utterance. The second group comprises output records 38 having recognition records 42 that indicate that the speech recognition system 36 incorrectly recognized the input utterance. Following the division of the output records 38 in step 116, the engine 24 generates, in step 118, the first histogram 28, and then generates, in step 120, the second histogram 30 as a final learning mode step. The method that the engine 24 uses to construct the first histogram 28 and the second histogram 30 will be described below with reference to FIG. 6.

Figure 6:
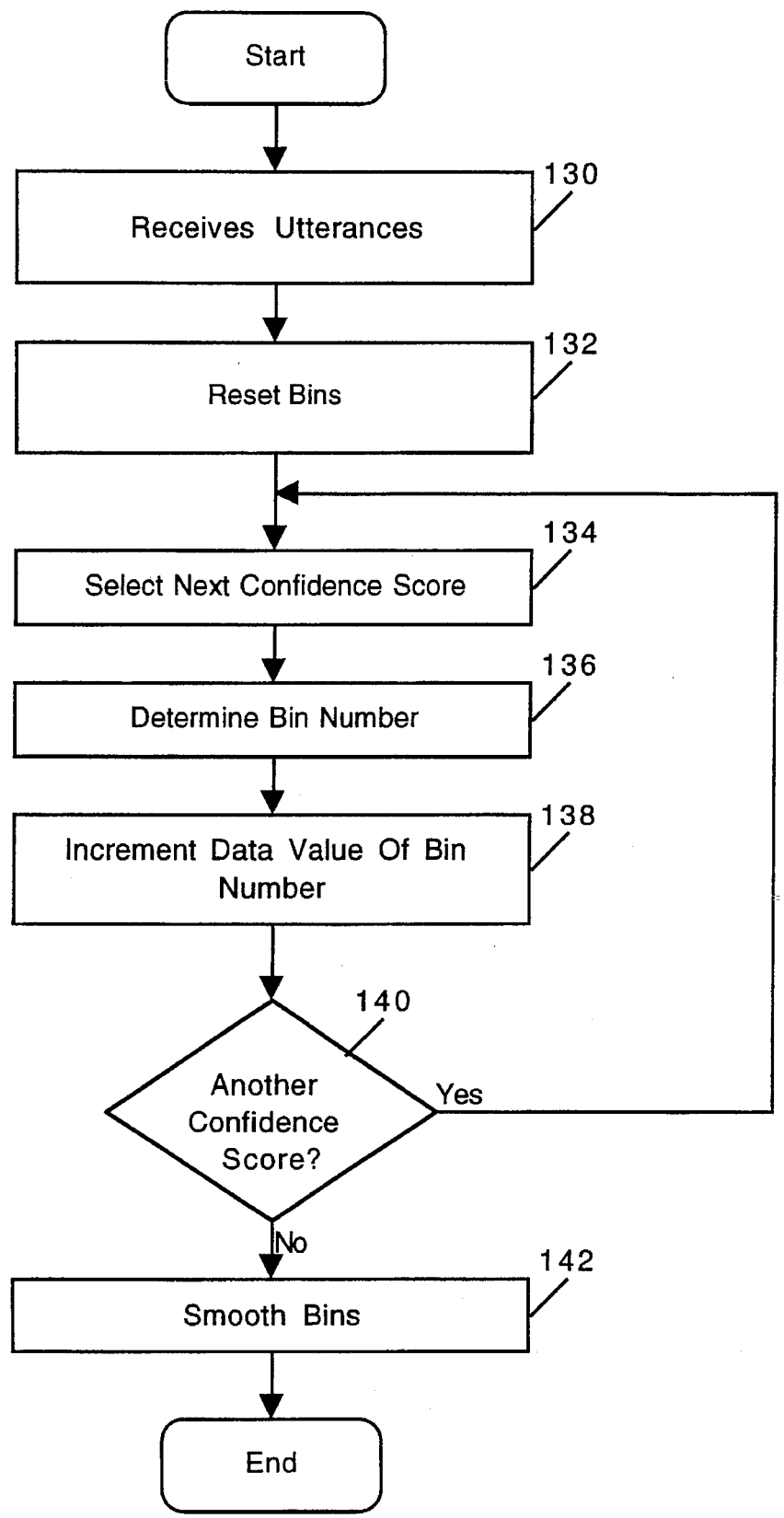
FIG. 6 is a flowchart showing the preferred method for generating a portion of the histogram object.

Referring now to FIG. 6, a flowchart of the preferred method for constructing the first histogram 28 and the second histogram 30 is shown. The method begins in step 130 with the engine 24 receiving from the data memory 22, a group of output records 38-1 to 38-n. When constructing the first histogram 28, the group of output records 38-1 to 38-n is the first group of output records 38-1 to 38-n where the recognition records 42 indicate that the speech recognition system 36 correctly recognized the utterance. When constructing the second histogram 30, the group of output records 38-1 to 38-n is the second group where the recognition records 42 indicate that the speech recognition system 36 incorrectly recognized the utterance.

In step 132, the engine 24 resets all data values, stored in the bins 32, 34, to zero. When constructing the first histogram 28, the data values in bins 32-1 to 32-n are reset; when constructing the second histogram 30, the data values in bins 34-1 to 34-n are reset. After resetting the data values, the engine 24 processes each output record 38 of the group. Each output record 38 is processed individually. In step 134, the next output record 38 0f the group is selected. The engine 24 determines, in step 136, a bin number for the output record 38, according to the following formulae:

Bin number 1 if $N(C - C_{min})/(C_{max} - C_{min}) <= 1$
Bin number 2 if $1 < N(C - C_{min})/(C_{max} - C_{min}) <= 2$
Bin number 3 if $2 < N(C - C_{min})/(C_{max} - C_{min}) <= 3$
...
Bin number N if $N - 1 < N(C - C_{min})/(C_{max} - C_{min})$ Where N is the number of bins 32, 34; C is the confidence score stored in the confidence record 40 of the output record 38; $C_{min}$ is the confidence score of the first output record selected in step 114 of FIG. 5B; and $C_{max}$ is the confidence score of the second output record selected in step 114 of FIG. 5B.

The data values of the bins 32, 34 indicate the occurrence of the associated bin number. Once the engine 24 has determined a bin number, the engine 24, in step 138, increments the data value, $D_x$, stored in the bin 32 or 34 that the bin number identifies. When constructing the first histogram 28, the engine 24 would increment a bin 32 in the first histogram 28. Similarly, the engine 24 would increment a bin 34 in the second histogram when constructing the second histogram 30.

In step 140, the engine 24 determines if there is another output record 38 of the group to process. If there is another output record, the method returns to step 134 to process the next output record 38. If there are no additional output records 38 of the group, the method continues in step 142. In this way, the engine 24 stores the number of instances of an output record 38 having a bin number in the data value of the corresponding bin 32 or 34. For example, if the engine 24 determines that ten output records 38 are assigned bin number 3, the engine 24 stores the data value 10 in bin 32-3 or 34-3.

The engine 24, in step 142, smoothes the bins 32, 34 to obtain a smooth histogram 28, 30. An exemplary method for smoothing the bins 32, 34 is a simple linear extrapolation. For example, if bin 32-3 stores the data value 10, bin 32-4 stores the data value 0, and bin 32-5 stores the data value 20, the engine 24 will smooth the bins 32 by adjusting the data value stored in bin 32-4 so that it lies between the data value stored in bin 32-3 and the data value stored in bin 32-5. The engine 24 preferably uses a linear function to select a data value to smooth the bins 32, 34. In this example, the engine 24 would store the data value 15 in bin 32-4. There are many other alternative conventional methods that may be used to smooth the bins 32, 34. Construction of the histogram 28, 30 ends following step 142.

The method for constructing a histogram 28, 30 has just been described with reference to the first histogram 28. The method for constructing the second histogram 30 is identical except that the engine 24 constructs the second histogram 30 using the group of output records where the speech recognition system 36 incorrectly recognized an input utterance. Thus, the first histogram 28 is constructed for instances of correct recognition, and the second histogram 30 is constructed for instances of incorrect recognition.

Figure 7:
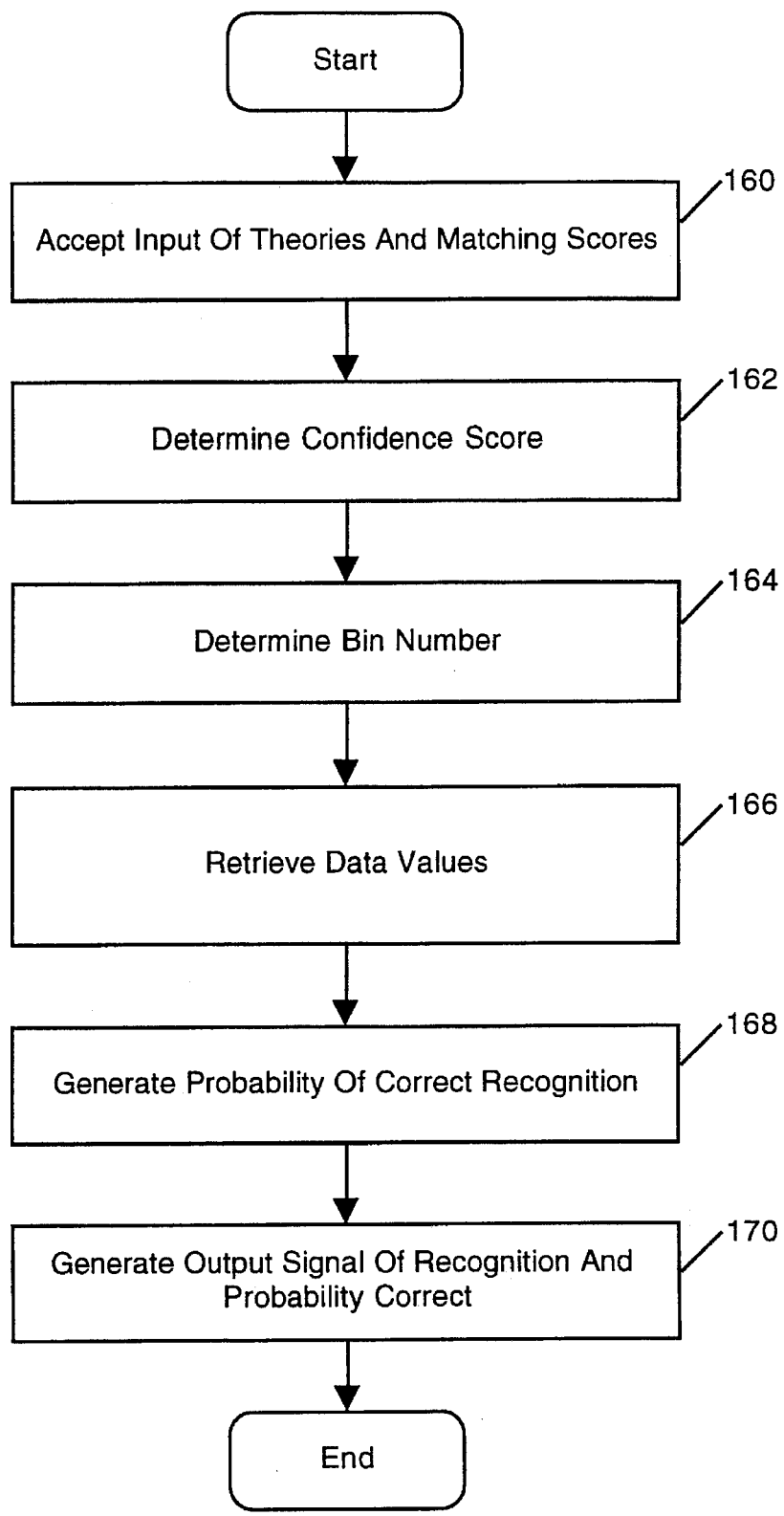
FIG. 7 is a flowchart showing the preferred method of the present invention for using the histogram object to generate an output signal that is proportional to the probability that a speech recognition system correctly recognized an input.

Referring now to FIG. 7, a flowchart of the user mode is shown, in which a signal proportional to the useability of the output of a speech recognition system 36 is generated. Beginning in step 160, the computer 10 accepts an output, comprising a first highest matching score and a second highest matching score, from the speech recognition system 36. The engine 24 determines, in step 62, the confidence score of the first ranked theory. The engine 24 determines the confidence score by subtracting the second highest matching score from the highest matching score. The result is the confidence score of the highest ranked theory. Once the confidence score is determined, the engine 24 determines, in step 164, the bin number for both the first histogram 28 and the second histogram 30. The bin number is determined by the formulae:

$$B = 1 \text{ if } N(C - C_{min})/(C_{max} - C_{min}) <= 1$$
$$B = 2 \text{ if } 1 < N(C - C_{min})/(C_{max} - C_{min}) <= 2$$
$$B = 3 \text{ if } 2 < N(C - C_{min})/(C_{max} - C_{min}) <= 3$$
$$\ldots$$
$$B = N \text{ if } N - 1 < N(C - C_{min})/(C_{max} - C_{min})$$

Where B is the bin number for the first histogram 28 and the second histogram 30; N is the number of bins 32, 34; C is the confidence score; $C_{min}$ is the confidence score of the first output record 38 that the engine 24 used to eliminate outlying data; and $C_{max}$ is the confidence score of the second output record 38 that the engine 24 used to eliminate outlying data. The first and second output records 38 were selected in step 114 of FIG. 5B. The bin number B indicates a bin 32-B and a bin 34-B. In step 166, engine 24 retrieves data value $D_{B1}$, stored in bin 32-B, and data value $D_{B2}$, stored in bin 34-B.

The engine 24, in step 168, determines the useability of the output of the speech recognition system 36. The engine 24 makes such a determination using the formula:

$$U = D_{B1}/(D_{B1} + D_{B2})$$

Where U is the useability of the output of the speech recognition system 36. Finally, in step 170, the engine 24 generates a signal that is proportional to the magnitude of U after which the method ends.

The computer 10 preferably takes the signal and uses it to determine if it should engage in a dialogue with the user regarding the input utterance. If the signal indicates that the probability that the speech recognition system 36 correctly recognized the input utterance is below a certain value, the computer 10 outputs on the output device 12 a dialogue box which request that the user input whether or not the matching statement does in fact match the input utterance. The dialogue box alternatively requests that the user repeat the utterance.

While the present invention has been described with reference to certain preferred embodiments, those skilled in the art will recognize that various modifications may be provided. The present invention may be used for handwriting recognition systems, pattern recognition systems, or fingerprint systems. The present invention need not end the learning mode. When in the user mode, the present invention may continue to add to the histogram object and continue learning. These and other variations upon and modifications to the preferred embodiments are provided for by the present invention, which is limited only by the following claims.

What is claimed is:

1. A method for determining the useability of output signals from a pattern recognition system, comprising the steps of:

accepting an output signal from the pattern recognition system;

generating a confidence score for the output signal;

retrieving occurrence data from a memory according to the confidence score;

comparing the retrieved occurrence data; and generating an output signal based on the compared occurrence data that indicates the useability of the output signal from the pattern recognition system.

2. The method of claim 1, wherein the memory comprises a lookup table.

3. The method of claim 2 wherein the lookup table comprises a histogram object.

4. The method of claim 3, wherein the histogram object comprises:

a first histogram, including a first plurality of bins for storing occurrence data, constructed from instances of correct recognition by the pattern recognition system; and a second histogram, including a second plurality of bins for storing occurrence data, constructed from instances of incorrect recognition by the pattern recognition system.

5. The method of claim 4 wherein the step of retrieving occurrence data comprises the steps of:

determining a bin number; and retrieving occurrence data stored in a bin indicated by the determined bin number.

6. The method of claim 5, wherein the occurrence data stored in a bin indicated by the determined bin number of the first histogram is expressed as DB1;

the occurrence data stored in a bin indicated by the determined bin number of the second histogram is expressed as DB2; and the step of comparing the retrieved occurrence data uses the equation:

$$U=DB1/(DB1+DB2)$$

to calculate a value U representing the useability of the output signal from the pattern recognition system.

7. The method of claim 5, wherein

N is defined as the bin number;

C is defined as the confidence score;

Cmin is defined as a lowest confidence score used to generate the histogram object;

Cmax is defined as a highest confidence score used to generate the histogram object; and the step of determining a bin number uses the equations:

$$\text{Bin number}=1 \text{ if } N(C\text{-}Cmin)/(Cmax\text{-}Cmin)<=1,$$

$$\text{Bin number}=2 \text{ if } 1<N(C\text{-}Cmin)/(Cmax\text{-}Cmin)<=2,$$

$$\text{Bin number}=3 \text{ if } 2<N(C\text{-}Cmin)/(Cmax\text{-}Cmin)<=3,$$

and $$\text{Bin number}=N \text{ if } N-1<N(C\text{-}Cmin)/(Cmax\text{-}Cmin).$$

8. The method of claim 1, wherein the output signal from the pattern recognition system comprises:

a first highest ranking matching score; and a second highest ranking matching score.

9. The method of claim 8, wherein the step of generating a confidence score comprises subtracting the second highest ranking matching score from the first highest ranking matching score.

10. The method of claim 1, wherein the occurrence data is learned occurrence data.

11. The method of claim 1 further comprising the step of opening a dialogue box in response to the generated output signal.

12. The method of claim 1, wherein the step of retrieving occurrence data is preceded by a learning method comprising the steps of:

receiving a plurality of inputs processed by the pattern recognition system including a first group of inputs having correct recognition records and a second group of inputs having incorrect recognition records;

generating a first histogram using the first group;

generating a second histogram using the second group; and determining a bin number.

13. The method of claim 12 wherein the step of generating a first histogram comprises the steps of:

assigning a bin number to each confidence score of the first group;

determining a frequency of occurrence of each bin number; and storing the frequency of occurrence of each bin number in a bin that corresponds to the bin number.

14. The method of claim 12 wherein the step of generating a second histogram comprises the steps of:

assigning a bin number to each confidence score of the second group;

determining a frequency of occurrence of each bin number; and storing the frequency of occurrence of each bin number in a bin that corresponds to the bin number.

15. The method of claim 12, further comprising the steps of:

opening a dialogue box;

displaying an output, in the dialogue box, from the pattern recognition system to a user; and displaying an input, in the dialogue box, that corresponds to the output to the user.

16. The method of claim 15, further comprising the step of receiving a signal from the user that indicates whether or not the pattern recognition system correctly recognized the input.

17. The method of claim 1, wherein said pattern recognition system is a speech recognition system, and the output signal based on the compared occurrence data is directly proportional to the probability that the speech recognition system correctly recognized an input signal.

18. A system for determining the useability of output signals from a pattern recognition system comprising:

a means for accepting an output signal from the pattern recognition system;

a means for obtaining a confidence score for the output signal;

a means for retrieving occurrence data from a lookup table;

a means for comparing the retrieved occurrence data; and a means for generating an output signal based on the compared occurrence data.

19. The system of claim 18 further comprising a means for constructing a histogram object.

20. The system of claim 19 wherein said means for constructing further comprises:

a means for generating a first histogram; and a means for generating a second histogram.

21. The system of claim 19 further comprising:

a means for receiving a plurality of inputs processed by the pattern recognition system;

a means for determining a confidence score for each received processed input; and a means for dividing the processed inputs into a first group where the pattern recognition system correctly recognized the input and into a second group where the pattern recognition system incorrectly recognized the input.

22. The system of claim 21 further comprising:

a means for determining a bin number;

a means for assigning a bin number to a confidence score;

a means for determining a frequency of occurrence of each bin number; and a means for storing the frequency of occurrence of each bin number in a bin that corresponds to the bin number.

23. The system of claim 18 further comprising a means for opening a dialogue box in response to an output signal generated by the means for generating an output signal based on the compared occurrence data.

24. The method of claim 18 wherein said pattern recognition system is a speech recognition system, and the output signal based on the compared occurrence data is directly proportional to the probability that the speech recognition system correctly recognized an input signal.

25. A method of using a computer processor to improve the usefulness of a pattern recognition system, comprising the steps of:

receiving confidence scores each representative of an input data pattern's likelihood of matching a most-likely theory compared to its likelihood of matching a second most-likely theory;

using each said confidence score to derive a useability rating for the respective input data pattern; and using said useability rating to determine whether to accept said most likely theory as a recognized input data pattern.

26. The method of claim 25 further comprising a leading mode, preceding the step of receiving, including the steps of:

receiving output records each including
a confidence score representative of an input data pattern's likelihood of matching a most-likely theory compared to its likelihood of matching a second most-likely theory; and
a recognition record indicating whether the pattern recognition system correctly recognized the input data pattern; and, constructing a histogram object, having first and second histograms having equal pluralities of bins, each bin within each histogram corresponding to a respective range of confidence values, by accumulating in each bin of the first histogram a total number of occurrences of receiving output records for input data patterns having confidence values in the range of that bin and having recognition records indicating correct recognition of that pattern, and by accumulating in each bin of the second histogram a total number of occurrences of receiving output records for input data patterns having confidence values in the range of that bin and having recognition records indicating incorrect recognition of that pattern; and wherein said step of using said useability rating uses a ratio of the total numbers of occurrences of patterns having recognition records indicating correct recognition and of the total numbers of occurrences of patterns having recognition records indicating incorrect recognition to determine useability ratings for input patterns having most-likely theories in the corresponding confidence ranges.

27. A computer-readable medium storing program instructions for using a computer processor to improve the usefulness of a pattern recognition system, said instructions comprising the steps of:

a learning mode including receiving output records each including
a confidence score representative of an input data pattern's likelihood of matching a most-likely theory compared to its likelihood of matching a second most-likely theory; and
a recognition record indicating whether the pattern recognition system correctly recognized the input data pattern; and constructing a histogram object, having first and second histograms having equal pluralities of bins, each bin within each histogram corresponding to a respective range of confidence values, by accumulating in each bin of the first histogram a total number of occurrences of receiving output records for input data patterns having confidence values in the range of that bin and having recognition records indicating correct recognition of that pattern, and by accumulating in each bin of the second histogram a total number of occurrences of receiving output records for input data patterns having confidence values in the range of that bin and having recognition records indicating incorrect recognition of that pattern; and a user mode including receiving confidence scores each representative of an input data pattern's likelihood of matching a most-likely theory compared to its likelihood of matching a second most-likely theory;

using each said confidence score to derive a useability rating for the respective input data pattern; and using said useability rating to determine whether to accept said most likely theory as a recognized input data pattern.

* * * * *